(12) United States Patent
Butt et al.

(10) Patent No.: US 9,021,175 B2
(45) Date of Patent: Apr. 28, 2015

(54) METHOD FOR REORDERING ACCESS TO REDUCE TOTAL SEEK TIME ON TAPE MEDIA

(75) Inventors: Kevin D. Butt, Tucson, AZ (US); Scott M. Fry, Tucson, AZ (US); Paul M. Greco, Tucson, AZ (US); Takashi Katagiri, Kanagawa-ken (JP); Yutaka Oishi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 12/862,198

(22) Filed: Aug. 24, 2010

(65) Prior Publication Data

US 2012/0054428 A1    Mar. 1, 2012

(51) Int. Cl.
*G06F 13/00* (2006.01)
*G06F 13/28* (2006.01)
*G06F 3/06* (2006.01)

(52) U.S. Cl.
CPC .............. *G06F 3/0659* (2013.01); *G06F 3/061* (2013.01); *G06F 3/0682* (2013.01); *G06F 3/0686* (2013.01)

(58) Field of Classification Search
CPC .............................. G06F 3/061; G06F 3/0686
USPC ...................... 711/4, 167, E12.002
See application file for complete search history.

(56) References Cited

U.S. PATENT DOCUMENTS

| | | | |
|---|---|---|---|
| 5,845,316 A | 12/1998 | Hillyer et al. | |
| 6,172,833 B1 | 1/2001 | Fry et al. | |
| 6,349,356 B2 | 2/2002 | Basham et al. | |
| 6,763,427 B1 | 7/2004 | Doi et al. | |
| 6,967,802 B1 | 11/2005 | Bailey | |
| 7,707,356 B2 | 4/2010 | Arulambalam et al. | |

(Continued)

FOREIGN PATENT DOCUMENTS

| | | |
|---|---|---|
| CN | 1786893 A | 6/2006 |
| DE | 004123873 A1 | 1/1992 |

(Continued)

OTHER PUBLICATIONS

Kazuki Ohta et al., "Gather-Arrange-Scatter: Node-Level Request Reordering for Parallel File Systems on Multi-Core Clusters," 2008.

(Continued)

*Primary Examiner* — Edward Dudek, Jr.
(74) *Attorney, Agent, or Firm* — Terrile, Cannatti, Chambers & Holland, LLP; Stephen A. Terrile

(57) ABSTRACT

A method, system and computer-usable medium are disclosed for reordering User Data Segment (UDS) lists to reduce seek times when accessing data stored on tape media. A host application sends a list of UDSs to a target tape drive and requests the tape drive to reorder the list to provide better performance. An ordered list of target User data Segments to retrieve from a target tape media is received. Information related to the location of each UDS on the target media is processed to determine its corresponding physical position on the tape media. The resulting physical positions are then processed to generate a reordered UDS list, where the order of the User Data Segments is reordered according to their physical location on the target tape media. The reordered list of User Data Segments is then used to perform seek, reposition and read operations to read User Data Segments from the tape media.

20 Claims, 5 Drawing Sheets

(56) References Cited

U.S. PATENT DOCUMENTS

| | | |
|---|---|---|
| 2001/0034811 A1* | 10/2001 | Basham et al. .............. 711/111 |
| 2002/0156968 A1 | 10/2002 | Haustein |
| 2004/0255091 A1 | 12/2004 | Justo et al. |
| 2006/0149898 A1 | 7/2006 | Bello et al. |
| 2007/0067595 A1 | 3/2007 | Ghose |
| 2007/0136540 A1 | 6/2007 | Matlock, Jr. |
| 2009/0019222 A1 | 1/2009 | Verma et al. |
| 2009/0248974 A1 | 10/2009 | Bello et al. |
| 2009/0327583 A1 | 12/2009 | Simonson |

FOREIGN PATENT DOCUMENTS

| | | | |
|---|---|---|---|
| EP | 000637824 A1 | 2/1995 | |
| EP | 000718827 A2 | 6/1996 | |
| GB | 2393804 A | 4/2004 | |
| JP | 2000048549 A | 2/2000 | |
| JP | 2001118365 A | 4/2001 | |
| JP | 2014081988 A | 5/2014 | |
| WO | 2010035617 A1 | 4/2010 | |
| WO | 2010073776 A1 | 7/2010 | |

OTHER PUBLICATIONS

Olav Sandsta et al., "Low-Cost Access Time Model for Serpentine Tape Drives," IEEE 16th Symposium on Mass Storage Systems, pp. 116-127, Mar. 15-18, 1999.

Olav Sandsta et al., "Improving the Access Time Performance of Serpentine Tape Drive," 15th International Conference on Data Engineering, pp. 542-551, Mar. 23-26, 1999.

Olav Sandsta et al., "Random I/O Performance of a Tandberg MLR1 Tamp Drive," pp. 91-102, 1998.

International Search Report and Written Opinion for PCT Application No. PCT/EP2011/064389, mailed Oct. 5, 2011.

* cited by examiner

METHOD FOR REORDERING ACCESS TO REDUCE TOTAL SEEK TIME ON TAPE MEDIA

BACKGROUND OF THE INVENTION

1. Field of the Invention

The present invention relates to managing access to data stored on tape media and more particularly, reordering User Data Segments (UDSs) in a list to reduce UDS seek times.

2. Description of the Related Art

The capacity of tape media used for data storage continues to increase for a corresponding form factor. For example, the native capacity of Linear Tape-Open (LTO) Generation 5 media is 1.5 terabytes (TB). As capacity of tape media has increased, its usage has changed. In the past, tape media has been primarily used for data back-up and archiving. Currently, it is also being used for a Virtual Tape Server (VTS), Hierarchical Storage Management (HSM), and file systems such as Long Term File System (LTFS).

The data transfer rate of tape media has also continued to increase. As an example the native read and write transfer rate of the previously-referenced LTO Generation 5 tape drives is 140 MB/second. In part, increases in data transfer rates are achieved through the use of data compression approaches. However, data seek times for an individual record on an LTO Generation 5 tape drive averages 1 minute. One reason for the long seek time is the combination of the length of LTO Generation 5 tape media, which is 800 meters, and its corresponding reposition velocity of approximately 10 meters/second. Another reason is that a tape drive typically does not know, with certainty, the actual physical position of a target record on the tape medium.

While long seek times are generally considered one of the weak points of a tape drive, they do not present too much of a disadvantage when accessing an individual record, or a sequence of records whose physical position are serially located on a tape media. However, long seek times can present additional latency when reading a sequence of target records that are not serially located on a tape media. In these situations, the tape drive is required to wind, and unwind, the tape media to search for a target record's location. As a result, the total amount of time it takes to read a sequence of non-serialized records can increase dramatically as the number of target records grows.

SUMMARY OF THE INVENTION

A method, system and computer-usable medium are disclosed for reordering User Data Segments (UDSs) in a list to reduce seek times when accessing data stored on tape media. In various embodiments, a User Data Segment (UDS) list reordering module is implemented on a tape drive, a tape library, or in a host. In these and other embodiments, the UDS list reordering module receives an ordered list of target User data Segments to retrieve from a tape media. The UDS list reordering module then interacts with a target tape media, which typically comprises a tape directory or other information related to the relationship between an individual record number and its corresponding physical position on the tape media. In turn, the tape media is read by a tape drive, which is capable of using the tape directory or other information to perform a seek operation, and then read a corresponding data record. In various embodiments, the tape drive is implemented with a tape library, which knows which tape media contains a target User Data Segment.

The UDS list reordering module then uses the tape directory or other information to process the ordered list of target User Data Segments to determine the physical location of each of the User Data Segments on the tape media. The resulting physical location is then processed by the UDS list reordering module to generate a reordered list of the User Data Segments, where the order of the User Data Segments are reordered according to their physical location on the target tape media. The UDS list reordering module then provides the reordered list of User Data Segments to an application, implemented on a host, which is capable of performing seek, reposition and read operations to read the User Data Segments from the tape media.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
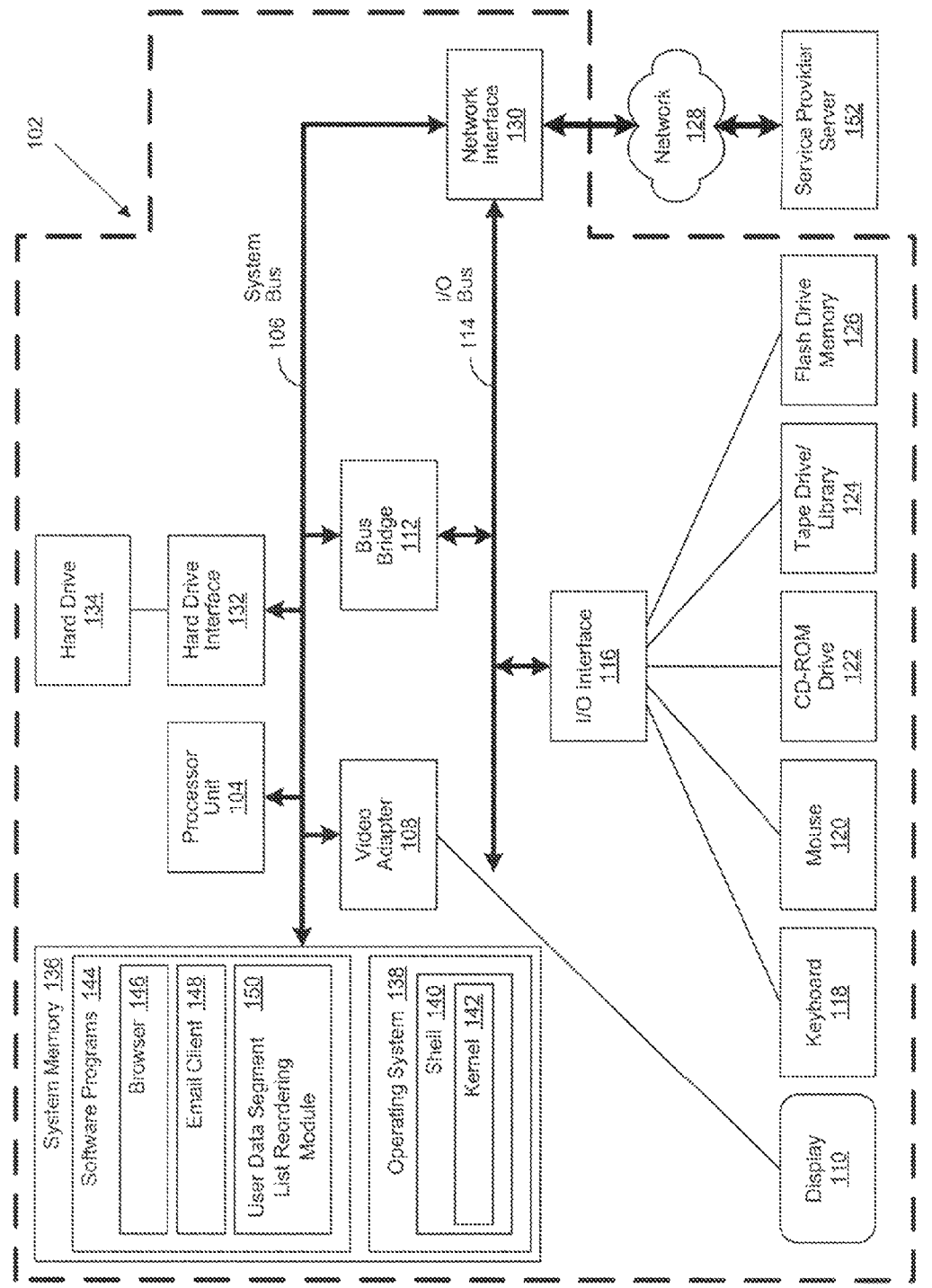
FIG. 1 depicts an exemplary client computer in which the present invention may be implemented.

A method, system and computer-usable medium are disclosed for reordering User Data Segment (UDS) lists to reduce seek times when accessing data stored on tape media. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a tape drive 124 (which may include one or a plurality of tapes to provide a library), and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a User Data Segment (UDS) list reordering module 150. The UDS list reordering module 150 includes code for implementing the processes described in FIGS. 2-4 described hereinbelow. In one embodiment, client computer 102 is able to download the UDS list reordering module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

As used herein, a data record is defined as the smallest distinct set of data provided (e.g., from a host) for processing and recording by a tape drive system, and likewise, the smallest distinct set of data that can be read from tape, reprocessed and made available (e.g., to a host) by a tape drive system. In various embodiments, an application running on a host generally writes or reads a set of multiple data records, referred to herein as a User Data Segment, at one time.

In these and other embodiments, the application typically invokes a load command to load a tape media which comprises a plurality of User Data Segments. Once the tape media is loaded, the application invokes a reposition command to seek a target User Data Segment, followed by the invocation of a read command to read it. These steps are then repeated until all target User Data Segments have been read.

However, before the seek operation can be performed, a tape drive first needs to estimate the physical position of a target data record. Since a tape media may contain millions of data records, it is not always practical to save each record's physical position on the tape media itself. Likewise, it can also be difficult to estimate a data record's physical position as each data record may be a different size. As a result, data record seek times can increase if the estimated physical position of the data record is far from its actual position.

In various embodiments, the physical location of a target User Data Segment, and its associated data records, is determined by processing data record numbers and other related information that is indexed to predetermined physical areas, or regions, on the tape media. In these and other embodiments, the data record location information is stored in a tape directory (TD), a file mark map, a high resolution tape directory (HRTD), or a virtual HRTD, or other data record indexing approaches familiar to skilled practitioners of the art.

Long seek times are typically not as problematic when a tape media is used for data back-up or archiving. In some cases only one or a few User Data Segments are read. In other cases, more User Data Segments are read, but they are typically in sequential order on the tape media, so seek times are generally incurred to locate the first User Data Segment. However, when a tape media is used for virtual tape store (VTS) or a file system, it is not unusual to read many User Data Segments on a tape media. For example, reclamation operations performed on a VTS and defragmentation operations performed on file system can incur the reading of many User Data Segments. In these cases, the accumulated seek times associated with individual seek operations add up, resulting in performance degradation.

In various embodiments, a User Data Segment (UDS) list reordering module is implemented on a tape drive, a tape library, or in a host. In these and other embodiments, the UDS list reordering module receives an ordered list of target User data Segments to retrieve from a tape media. The UDS list reordering module then interacts with a target tape media, which typically comprises a tape directory or other information related to the relationship between an individual record number and its corresponding physical position on the tape media. In turn, the tape media is read by a tape drive, which is capable of using the tape directory or other information to perform a seek operation, and then read a corresponding data record. In various embodiments, the tape drive is implemented with a tape library, which knows which tape media contains a target User Data Segment.

In various embodiments, the distance ('D') between a first User Data Segment 'A' and a second User Data Segment 'B', is determined by using the following algorithm:

$$D=|E(E(A)-S(B)|/V$$

In this algorithm, D is the distance between User Data Segment 'A' and User Data Segment 'B', E(X) is the length from the beginning of a tape to the end of User Data Segment X, S(X) is the length from the beginning of a tape to the start of User Data Segment X, and V is the velocity of a tape media to seek a User Data Segment.

The UDS list reordering module then uses the calculated distance ('D') information to process the ordered list of target User Data Segments to determine the physical location of each of the User Data Segments on the tape media. The resulting physical location is then processed by the UDS list reordering module to generate a reordered list of the User Data Segments, where the order of the User Data Segments are reordered according to their physical location on the target tape media. The UDS list reordering module then provides the reordered list of User Data Segments to an application, implemented on a host, which is capable of performing seek, reposition and read operations to read the User Data Segments from the tape media.

Figure 2:
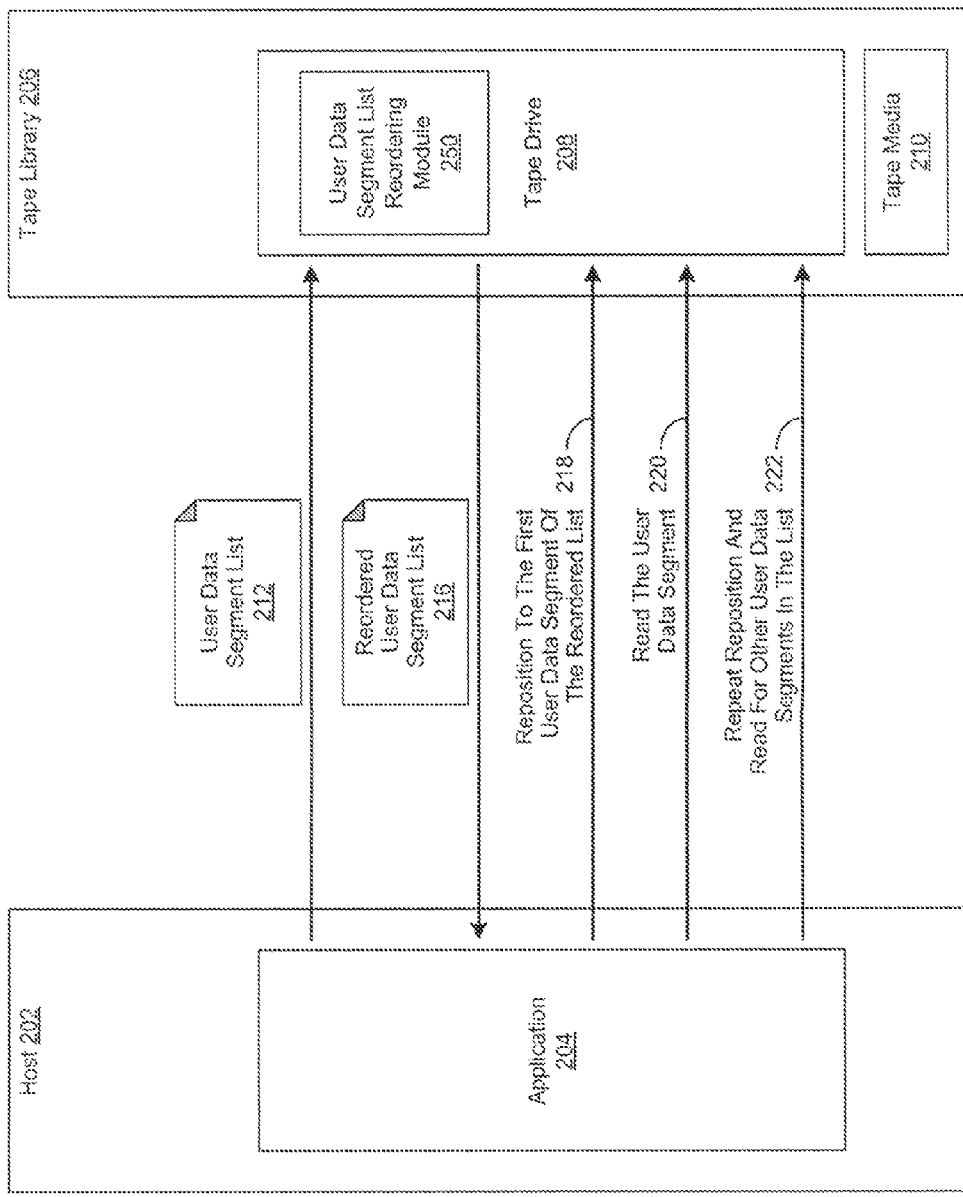
FIG. 2 is a simplified block diagram of a User Data Segment (UDS) list reordering module as implemented on a tape drive.

FIG. 2 is a simplified block diagram of a User Data Segment (UDS) list reordering module as implemented on a tape drive in accordance with an embodiment of the invention. In this embodiment, tape library 206 comprises a tape media 210 and a tape drive 208, which in turn comprises User Data Segment (UDS) list reordering module 250. Host 202 comprises an application 204, which is capable of performing seek, reposition and read operations associated with tape library 206, tape drive 208, UDS list reordering module 250, and tape media 210.

As described in greater detail herein, the application 204 provides a User Data Segment list 212 to the UDS list reordering module 250, which determines the physical location of each User Data Segment on tape media 210. Once the physical locations are determined, the UDS list reordering module 250 generates a reordered User Data Segment list 216, which is then provided to the application 204. The application then uses the reordered User Data Segment list 216 to perform repositioning operations to reposition 218 the tape media 210 to the first User Data Segment in the reordered User Data Segment list 216. Thereafter, the application performs read operations to read 220 the first User Data Segment in the reordered User Data Segment list 216. Once the first User Data Segment has been read, the application 204 continues to use the reordered User Data Segment list 216 to perform repositioning and read operations to read the remaining User Data Segments in the reordered User Data Segment list 216. It will be appreciated by those of skill in the art that in this embodiment, no changes to the tape library 206 or the application 204 is necessary if the tape drive 208 is replaced with a later model of tape drive 208 in the future.

Figure 3:
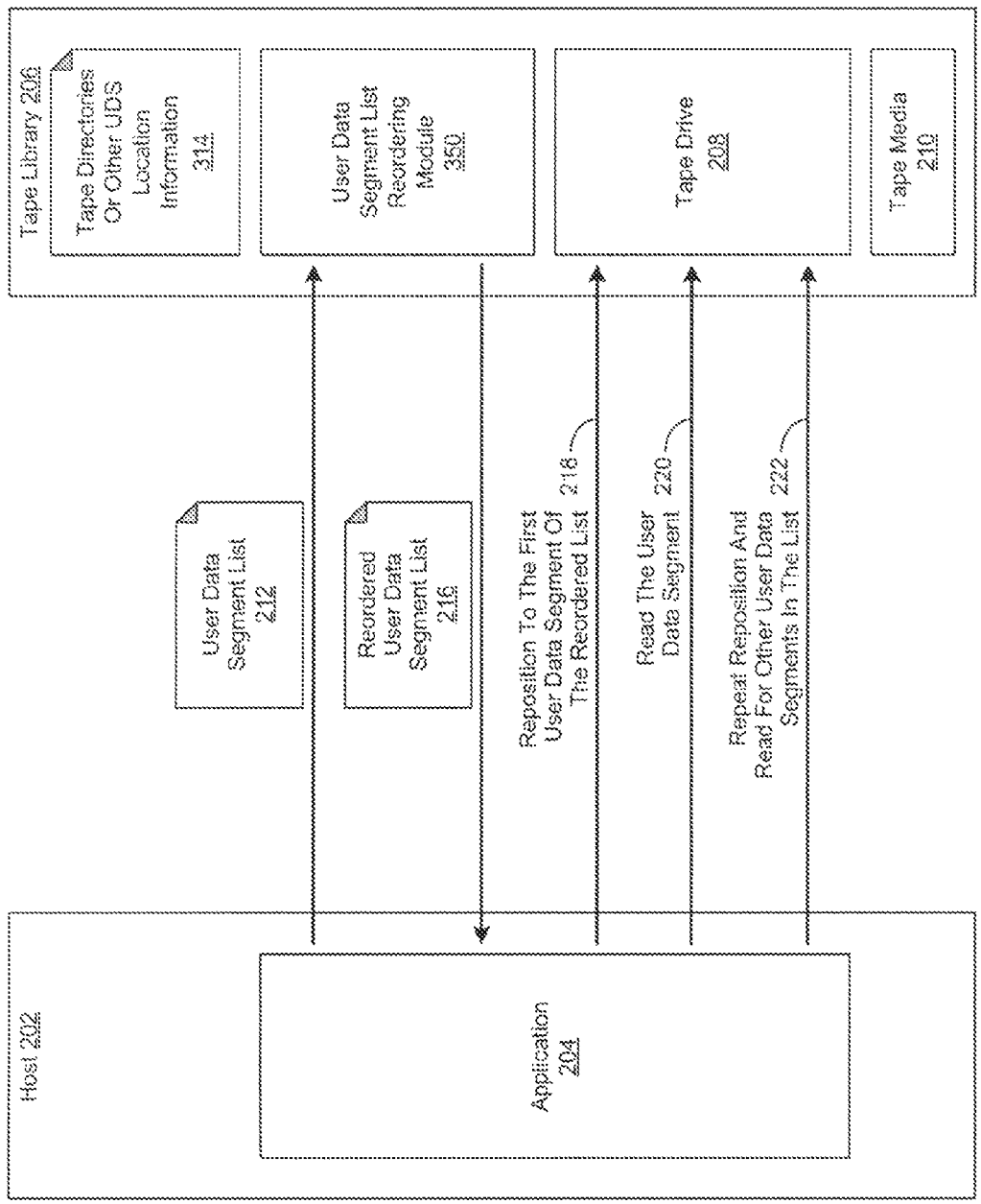
FIG. 3 is a simplified block diagram of a UDS list reordering module as implemented on a tape library.

FIG. 3 is a simplified block diagram of a User Data Segment (UDS) list reordering module as implemented on a tape library in accordance with an embodiment of the invention. In this embodiment, tape library 206 comprises a tape media 210, a tape drive 208, a User Data Segment (UDS) list reordering module 350, and tape directories or other User Data Segment location information 314. Host 202 comprises an application 204, which is capable of performing seek, reposition and read operations associated with tape library 206, tape drive 208, UDS list reordering module 250, and tape media 210.

As described in greater detail herein, the application 204 provides a User Data Segment list 212 to the UDS list reordering module 350, which determines the physical location of each User Data Segment on tape media 210. Once the physical locations are determined, the UDS list reordering module 350 generates a reordered User Data Segment list 216, which is then provided to the application 204. The application then uses the reordered User Data Segment list 216 to perform repositioning operations to reposition 218 the tape media 210 to the first User Data Segment in the reordered User Data Segment list 216. Thereafter, the application performs read operations to read 220 the first User Data Segment in the reordered User Data Segment list 216. Once the first User Data Segment has been read, the application 204 continues to use the reordered User Data Segment list 216 to perform repositioning and read operations to read the remaining User Data Segments in the reordered User Data Segment list 216. It will be appreciated by those of skill in the art that this embodiment allows the tape library 206 to select a target tape media 210 if desired User Data Segments are recorded in multiple tape media 210 cartridges.

Figure 4:
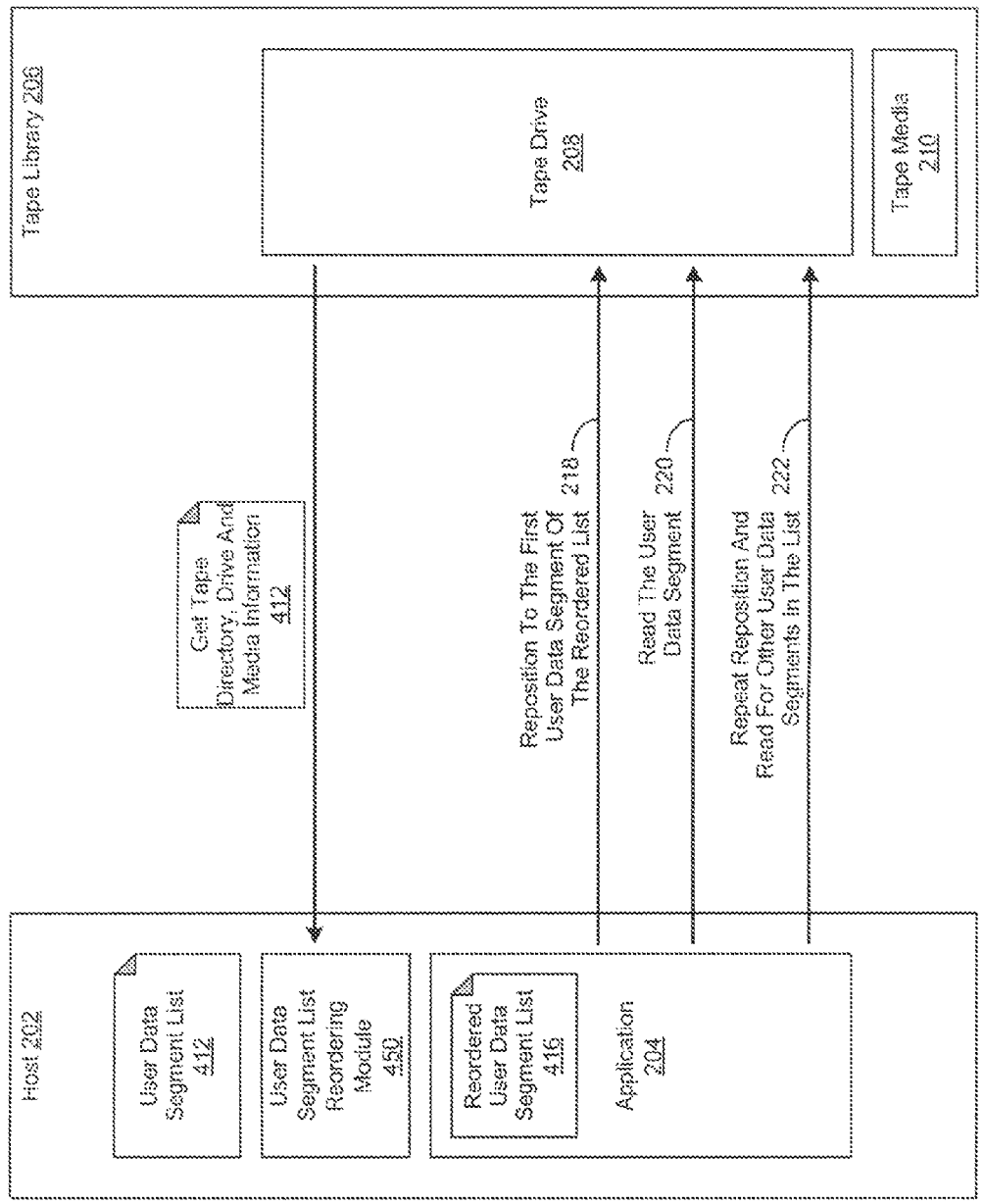
FIG. 4 is a simplified block diagram of a UDS list reordering module as implemented on a host.

FIG. 4 is a simplified block diagram of a UDS list reordering module as implemented on a host in accordance with an embodiment of the invention. In this embodiment, tape library 206 comprises a tape media 210 and a tape drive 208. Host 202 comprises a User Data Segment (UDS) list reordering module 450, a User Data Segment list 412, and an application 204, which is capable of performing seek, reposition, and read operations associated with tape library 206, tape drive 208, UDS list reordering module 250, and tape media 210.

In this embodiment, the application 204 receives tape directory, tape drive, and tape media information 412 from either tape library 206 or tape drive 208. The UDS list reordering module 450 then uses the tape directory, tape drive, and tape media information 412 to determine the physical location of each User Data Segment on tape media 210. Once the physical locations are determined, the UDS list reordering module 450 then processes the User Data Segment list 412 to generate a reordered User Data Segment list 416, which is then provided to the application 204. The application then uses the reordered User Data Segment list 416 to perform repositioning operations to reposition 218 the tape media 210 to the first User Data Segment in the reordered User Data Segment list 216. Thereafter, the application performs read operations to read 220 the first User Data Segment in the reordered User Data Segment list 216. Once the first User Data Segment has been read, the application 204 continues to use the reordered User Data Segment list 216 to perform repositioning and read operations to read the remaining User Data Segments in the reordered User Data Segment list 216.

Figure 5:
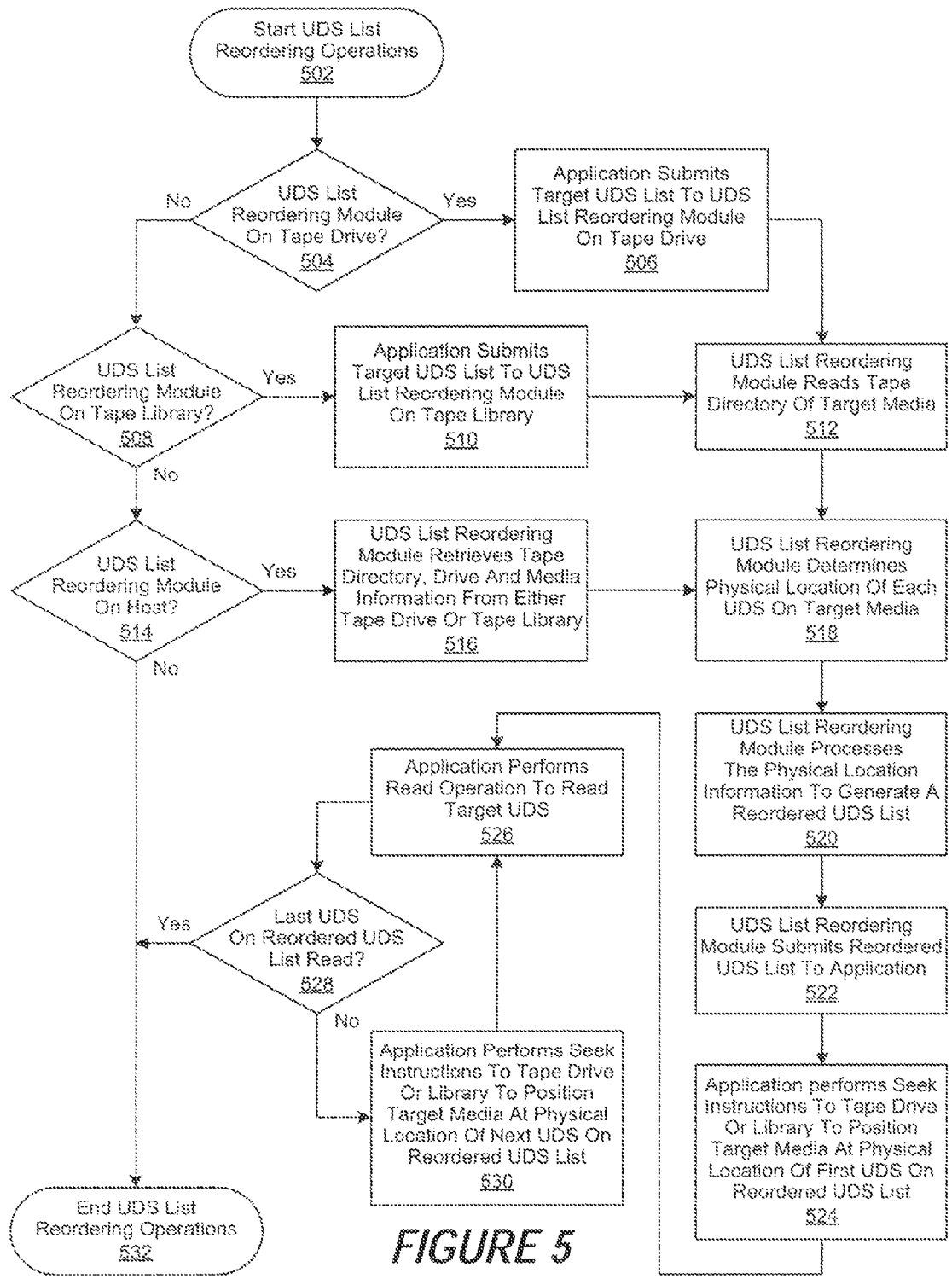
FIG. 5 is a generalized flow chart of the operation of a UDS list reordering module.

FIG. 5 is a generalized flow chart of the operation of a User Data Segment (UDS) list reordering module as implemented in accordance with an embodiment of the invention. In this embodiment, UDS list reordering operations are begun in step 502, followed by a determination being made in step 504 whether a UDS list reordering module is implemented on a target tape drive. If so, then an application, as described in greater detail herein, submits a target UDS list to the UDS list reordering module on the tape drive in step 506. Otherwise, a determination is made in step 508 whether a UDS list reordering module is implemented on a target tape library. If so, then an application, as described in greater detail herein, submits a target UDS list to the UDS list reordering module on the tape library in step 510. Once the UDS list has been respectively submitted to the UDS list reordering module in step 506 or step 510, the UDS list reordering module reads the tape directory of a target media in step 512.

However, if it was determined in step 508 that a UDS list reordering module was not implemented on a tape library, then a determination is made in step 415 whether a UDS list reordering module is implemented on a host. If not, then UDS list reordering operations are ended in step 532. Otherwise, the UDS list reordering module retrieves tape directory, tape drive, and tape media information either from a target tape drive or a target tape library. Thereafter, or once the UDS list reordering module reads the tape directory of target media in step 512, the UDS list reordering module determines physical location information associated with each UDS on the tape media in step 518.

Thereafter, the UDS list reordering module processes the physical location information in step 520 to generate a reordered UDS list, which is then submitted to the application in step 522. In turn, the application performs seek operations in step 524 to position the target media at the location of the first UDS on the reordered UDS list. Thereafter, the application performs read operations to read the target UDS. A determination is then made in step 528 whether the last UDS on the reordered UDS list has been read. If so, then UDS list reordering operations are ended in step 532. Otherwise, the application performs seek operations in step 530 to position the tape media at the physical location of the next UDS on the reordered UDS list. The process is then continued, proceeding with step 526.

Although the present invention has been described in detail, it should be understood that various changes, substitutions and alterations can be made hereto without departing from the spirit and scope of the invention as defined by the appended claims.

What is claimed is:

1. A method for managing access to data stored on tape media, the method comprising:
receiving a request to retrieve an ordered list of User Data Segments from a target tape media;
determining the physical location of each of the User Data Segments on the target tape media, the determining the physical location comprising determining a distance between each of the User Data Segments of the ordered list of User Data Segments;
performing reordering operations to generate a reordered list of the User Data Segments, wherein the order of the User Data Segments are reordered according to their physical location on the target tape media; and
initiating the retrieval of the User Data Segments from the target tape media in their order on the reordered list; and
wherein,
the distance between each of the User Data Segments of the ordered list is calculated as $$D=|E(A)-S(B)|/V$$

where D corresponds to a distance between a first User Data Segment and a second User Data Segment, E(X) corresponds to a length from a beginning of a tape to an end of a User Data Segment X, S(X) corresponds to a length from the beginning of the tape to a start of User Data Segment X, and V is a velocity of a tape media to seek a User Data Segment; and,
the determining the physical location uses the calculated distance (D) to process the ordered list of User Data Segments to determine the physical location of each of the User Data Segments.

2. The method of claim 1, wherein the reordering operations are processed by a tape drive comprising processing logic operable to generate the reordered list of the User Data Segments.

3. The method of claim 1, wherein the reordering operations are processed by a tape library comprising processing logic operable to generate the reordered list of the User Data Segments.

4. The method of claim 1, wherein the reordering operations are processed by a host comprising processing logic operable to generate the reordered list of the User Data Segments.

5. The method of claim 1, wherein individual User Data Segments comprise a plurality of data records.

6. The method of claim 1, wherein the physical location of the User Data Segments on the target tape media is determined by processing User Data Segment tape media location data stored in one of:
a tape directory (TD);
a filemark map;
a high resolution tape directory (HRTD); or
a virtual HRTD.

7. A system comprising:
   a processor;
   a data bus coupled to the processor; and
   a computer-usable medium embodying computer program code, the computer-usable medium being coupled to the data bus, the computer program code for managing access to data stored on tape media and comprising instructions executable by the processor and configured for:
   receiving a request to retrieve an ordered list of User Data Segments from a target tape media;
   determining the physical location of each of the User Data Segments on the target tape media, the determining the physical location comprising determining a distance between each of the User Data Segments of the ordered list of User Data Segments;
   performing reordering operations to generate a reordered list of the User Data Segments, wherein the order of the User Data Segments are reordered according to their physical location on the target tape media; and
   initiating the retrieval of the User Data Segments from the target tape media in their order on the reordered list; and wherein,
   the distance between each of the User Data Segments of the ordered list is calculated as $$D=|E(A)-S(B)|/V$$

where D corresponds to a distance between a first User Data Segment and a second User Data Segment, $E(X)$ corresponds to a length from a beginning of a tape to an end of a User Data Segment X, $S(X)$ corresponds to a length from the beginning of the tape to a start of User Data Segment X, and V is a velocity of a tape media to seek a User Data Segment and,
   the determining the physical location uses the calculated distance (D) to process the ordered list of User Data Segments to determine the physical location of each of the User Data Segments.

8. The system of claim 7, wherein the reordering operations are processed by a tape drive comprising processing logic operable to generate the reordered list of the User Data Segments.

9. The system of claim 7, wherein the reordering operations are processed by a tape library comprising processing logic operable to generate the reordered list of the User Data Segments.

10. The system of claim 7 wherein the reordering operations are processed by a host comprising processing logic operable to generate the reordered list of the User Data Segments.

11. The system of claim 7, wherein individual User Data Segments comprise a plurality of data records.

12. The system of claim 7, wherein the physical location of the User Data Segments on the target tape media is determined by processing User Data Segment tape media location data stored in one of:
   a tape directory (TD);
   a filemark map;
   a high resolution tape directory (HRTD); or
   a virtual HRTD.

13. A non-transitory computer-usable medium embodying computer program code, the computer program code comprising computer executable instructions configured for:
   receiving a request to retrieve an ordered list of User Data Segments from a target tape media;
   determining the physical location of each of the User Data Segments on the target tape media, the determining the physical location comprising determining a distance between each of the User Data Segments of the ordered list of User Data Segments;
   performing reordering operations to generate a reordered list of the User Data Segments, wherein the order of the User Data Segments are reordered according to their physical location on the target tape media; and
   initiating the retrieval of the User Data Segments from the target tape media in their order on the reordered list; and wherein,
   the distance between each of the User Data Segments of the ordered list is calculated as $$D=|E(A)-S(B)|/V$$

where D corresponds to a distance between a first User Data Segment and a second User Data Segment, $E(X)$ corresponds to a length from a beginning of a tape to an end of a User Data Segment X, $S(X)$ corresponds to a length from the beginning of the tape to a start of User Data Segment X, and V is a velocity of a tape media to seek a User Data Segment; and,
   the determining the physical location uses the calculated distance (D) to process the ordered list of User Data Segments to determine the physical location of each of the User Data Segments.

14. The computer usable medium of claim 13, wherein the reordering operations are processed by a tape drive comprising processing logic operable to generate the reordered list of the User Data Segments.

15. The computer usable medium of claim 13, wherein the reordering operations are processed by a tape library comprising processing logic operable to generate the reordered list of the User Data Segments.

16. The computer usable medium of claim 13, wherein the reordering operations are processed by a host comprising processing logic operable to generate the reordered list of the User Data Segments.

17. The computer usable medium of claim 13, wherein individual User Data Segments comprise a plurality of data records.

18. The computer usable medium of claim 13, wherein the physical location of the User Data Segments on the target tape media is determined by processing User Data Segment tape media location data stored in one of:
   a tape directory (TD);
   a filemark map;
   a high resolution tape directory (HRTD); or
   a virtual HRTD.

19. The computer usable medium of claim 13, wherein the computer executable instructions are deployable to a client computer from a server at a remote location.

20. The computer usable medium of claim 13, wherein the computer executable instructions are provided by a service provider to a customer on an on-demand basis.

* * * * *